United States Patent

Schiefer et al.

[15] 3,667,296
[45] June 6, 1972

[54] METHOD AND APPARATUS FOR DETERMINING THE SURFACE LEVEL OF MOLTEN MATERIAL IN A MOLD

[72] Inventors: Peter Schiefer, Muehlheim(Ruhr); Bernd Findeisen, Duisburg-Buchholz, both of Germany

[73] Assignee: Mannesmann Aktiengesellschaft, Dusseldorf, Germany

[22] Filed: July 24, 1970

[21] Appl. No.: 58,044

[30] Foreign Application Priority Data

July 28, 1969  Germany .................... P 19 38 840.0

[52] U.S. Cl. .................................................. 73/304 R, 164/4
[51] Int. Cl. ............................. B22d 11/10, G01f 23/24
[58] Field of Search ........................... 73/304 R; 164/4, 150

[56] References Cited

UNITED STATES PATENTS

| 3,369,401 | 2/1968 | Briggs et al. | 73/304 R |
| 3,478,808 | 11/1969 | Adams | 164/4 |
| 1,532,871 | 4/1925 | Bloch | 73/304 R X |
| 3,184,970 | 5/1965 | McNelly | 73/304 R |

FOREIGN PATENTS OR APPLICATIONS

| 1,105,568 | 4/1961 | Germany | 73/304 R |

Primary Examiner—S. Clement Swisher
Assistant Examiner—Frederick Shoon
Attorney—Smyth, Roston & Pavitt and Ralf H. Siegemund

[57] ABSTRACT

The rising level of molten metal in a mold, pertaining, for example, to a continuous casting apparatus, is supervised by electrical resistance wire probes dipping into the mold and short circuited by the molten metal therein. The resistance change in the circuit is ascertained and used as level indication.

4 Claims, 1 Drawing Figure

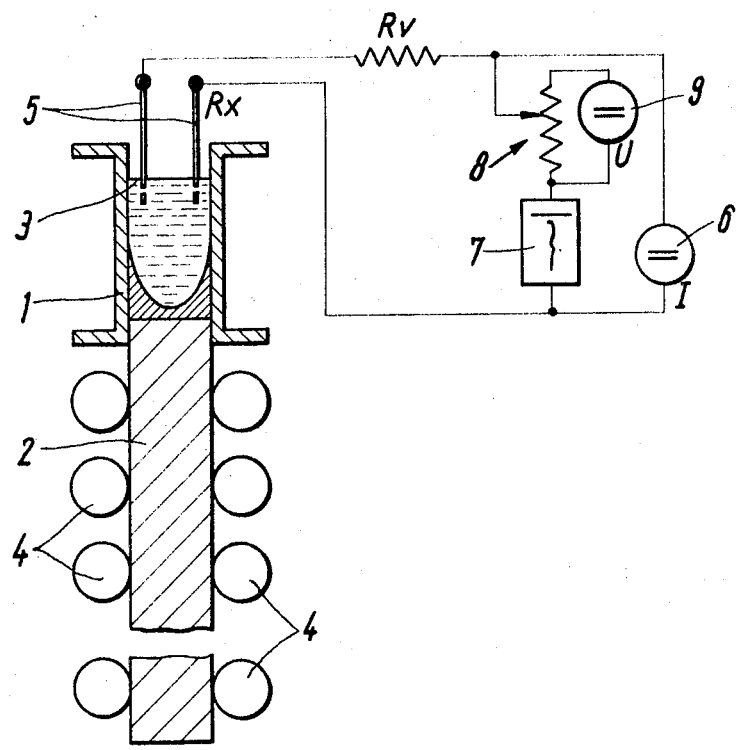

METHOD AND APPARATUS FOR DETERMINING THE SURFACE LEVEL OF MOLTEN MATERIAL IN A MOLD

The present invention relates to method and equipment for determining the height of the rising surface level of molten material in a mold that is closed at the bottom and is being charged. The invention will find particular utility in machines for continuous casting of steel particularly during the initial phase of operation, when the bottom of the mold is still closed.

The problem, thus stated, has not been solved satisfactorily in the past. In accordance with the invention, it is suggested to provide two resistance wire probes which extend into the mold, down to the vicinity of the bottom thereof. As molten, liquidous metal, or the like, pours into the mold, the probes are interconnected electrically, and the resistance of the closed circuit, thus established, decreases with increasing level height of the molten metal in the mold. The two probes are connected to a biasing voltage, and the change in resistance in that circuit will be measured through measurement of appropriate operating parameters, e.g., current and/or voltage, for example, by means of suitable resistance measuring network. The probes must be chosen to experience a significant change in resistance within that biasing circuit when the level of metal rises in the mold and shortens the effective portions of the probes in the circuit.

A particular form of practicing the invention includes metallic wire probes which melt where submerged in the liquidous metal. The probes may well consist of the same material that is used for casting. The resistance of the probes as effective in the circuit varies linearly with length that is still above the surface level of the molten metal and is, thus, directly representative of the level height in the mold.

The invention will find utility in all methods of casting where the level of the molten material may rise for any reason and wherein that rise, or even the rate of rising, is to be supervised to obtain and to control, for example, a definite rate and speed of filling the mold.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

The FIGURE illustrates somewhat schematically a continuous casting machine improved by a supervising circuit in accordance with the present invention.

Proceeding now to the detailed description of the drawings, there is illustrated a mold 1 for continuous casting. The bottom of the mold is shown as having been closed by an ingot blank or stool 2. Liquid metal, such as steel, is poured into the mold be means of a ladle or the like (not shown). The bottom of the mold must remain closed in the manner illustrated until the molten metal has reached a particular level 3 that is determined by casting technique generally. Subsequently, the ingot blank is drawn out of the mold and lowered, followed by the casting string that is formed pursuant to this procedure. Rolls 4 guide the withdrawal of the ingot blank as well as of the casting string that follows.

Having described the background and environment for practicing the invention, we now turn to particulars thereof, provided for ascertaining the rising surface level of the molten material in the mold during the initial phase. The surface level will indeed rise as long as the bottom of the mold is closed by ingot blank 2. There are provided two parallely disposed probes 5. The probes 5 are constructed from resistance wires of about 3 mm diameter. The two probes pertain to an electrical circuit which includes a d.c. voltage source 6 to obtain operational bias. The two probes 5 connect to terminals of opposite polarity of the voltage source, so that a current is driven through the circuit to flow through the probes and across the molten metal.

Initially, probes 5 extend almost all the way to the bottom of the mold. As long as the mold is empty, the circuit is open. As molten metal pours into the mold, the respective portions of the wires, dipping into the liquidous metal, melt. Nevertheless, the two probes 5 are, and remain, electrically interconnected at or near the surface of the liquid metal. As the mold fills, the length of the probes above the surface level of the molten material, declines. The fact that the probes have melted away below that rising level does not change the fact that the two probes remain electrically interconnected by the rather low resistance of the molten material into which they dip.

The resistance of the electric circuit has essentially two components: $R_x$ and $R_v$. Resistance $R_x$ is primarily determined by the lengths of the probes 5 above the surface level in the mold, not yet melted. The other component is essentially the line resistance $R_v$. As the probes are parallel to each other equidistant spacing is established between them resulting in a constant length current path through the molten metal. Thus, the conditions for electric circuit between the two probes across the molten metal remains essentially independent from the level the material in the mold has reached. The resistivity of that path through the molten material can be regarded as being included in line resistance $R_v$, constituting a known and essentially constant parameter.

As the liquid level rises, the resistance $R_x$ in the circuit varies (declines) linearly therewith, and the variation can be used as indication for the relative liquid level height in the mold. The circuit between the probes is essentially closed always in or directly underneath the surface level. probes are connected in series in the circuit, the level change is effective twice, once in each probe.

For measuring the resistance $R_x$ in representation of liquid level height, resistance networks known per se are used. The resistance network will be conventional, and may include source 6 as constant current source (current I). The permissible voltage change may be limited, but must include the range of interest and as needed for measurement. A recording voltmeter 7 is connected across the source 6, to register the voltage drop variations as they result from a change in resistance $R_x$. In order to compensate the circuit resistance $R_v$, a voltage source 9, providing a compensating voltage U, is connected via a potentiometer 8 in opposition to the measuring voltage as applied to and effective across voltmeter 7. The potentiometer 8 is adjusted for determining the operating point of measurement, and can be used for calibrating the instrument 7.

The circuit is shown as a representative example only, a different circuit can be employed, using, for example, a constant voltage source while the voltage drop across a series, constant resistor is used to measure the change in probe resistance.

The example above refers specifically to the determination of the level of the molten metal in the mold of a continuous casting machine, operable particularly upon starting thereof. The inventive method, however, is applicable equally well for casting of block ingots.

The invention is not limited to the embodiments described above but all changes and modifications thereof not constituting departures from the spirit and scope of the invention are intended to be included.

We claim:

1. Apparatus for measuring the rising surface level of molten metal in a mold, comprising:
    a pair of resistance wire probes made of the same metal as the molten metal in the mold and disposed in parallel relationship and dipping into the mold to extend down to the vicinity of the bottom thereof;
    a source of electrical voltage potential connected to the wires of the pair to apply biasing voltage thereto, to provide current flow through the wire probes, there being a closed circuit established when the wire probes are interconnected by molten metal in the mold, the wire probes of the pair being connected in series in the circuit; and
    means connected for measuring the change in resistance in the circuit to obtain representation of rising level of molten metal in the mold.

2. Apparatus as in claim 1, the wire probes stationarily disposed to dip into the mold, the circuit including a resistance measuring circuit.

3. Apparatus for measuring the rising surface level of molten metal in a mold, comprising;
a pair of resistance wire probes, made of metal that melts in the molten metal in the mold and disposed in parallel relationship and dipping into the mold to extend down to the vicinity of the bottom thereof;
a source of electrical voltage potential connected to the wires of the pair to apply biasing voltage thereto, to provide current flow through the wire probes, there being a closed circuit established when the wire probes are interconnected by molten metal in the mold, the wire probes of the pair being connected in series in the circuit; and
means connected for measuring the change in resistance in the circuit to obtain representation of rising level of molten metal in the mold.

4. Apparatus as in claim 3, the wire probes stationarily disposed to dip into the mold, the circuit including a resistance measuring circuit.

* * * * *